Patented Mar. 5, 1946

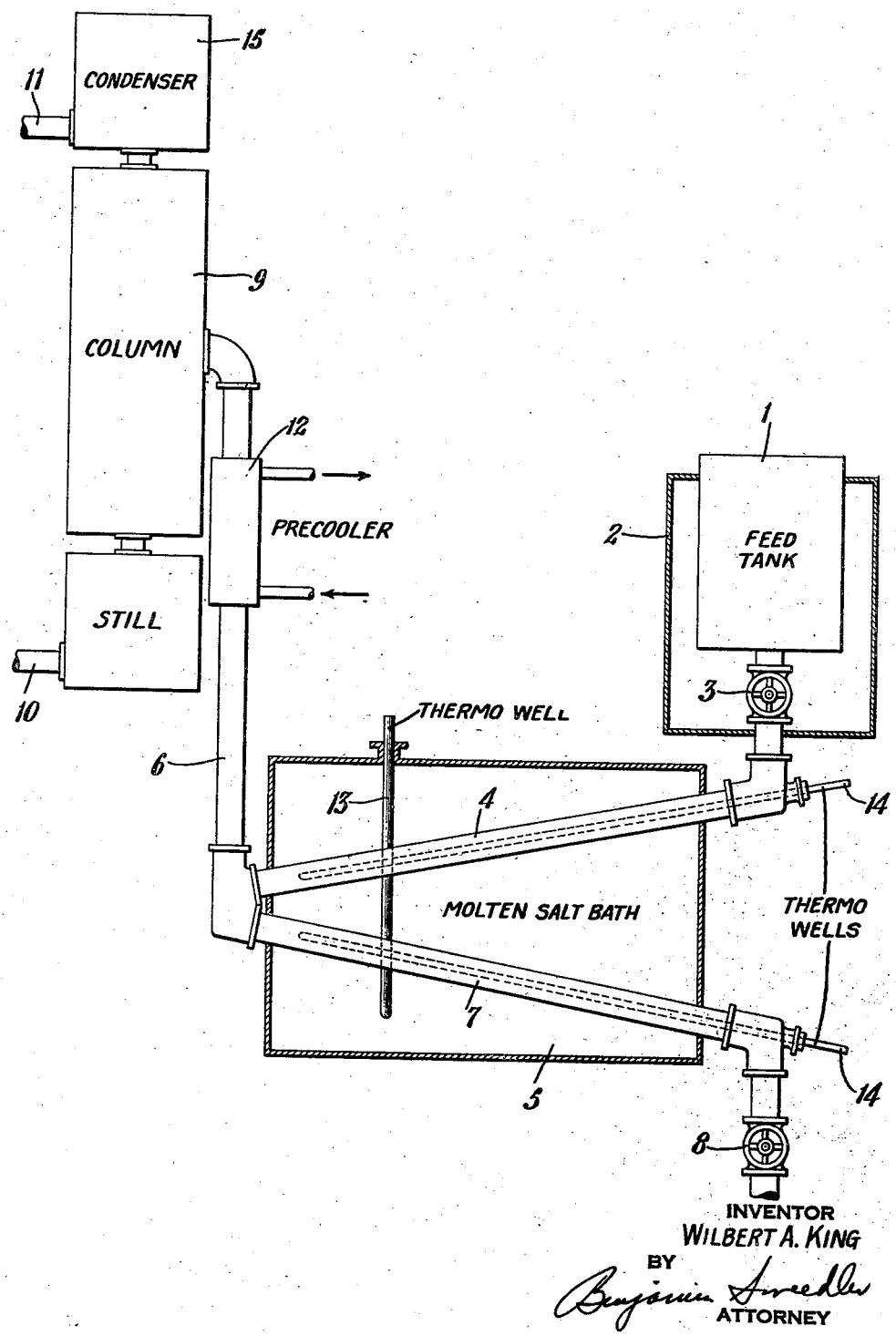

2,395,829

UNITED STATES PATENT OFFICE 2,395,829

PRODUCTION OF STYRENE COMPOUNDS BY PYROLYSIS

Wilbert A. King, Meriden, Conn., assignor, by mesne assignments, to Allied Chemical & Dye Corporation, a corporation of New York Application August 19, 1941, Serial No. 407,448

10 Claims. (Cl. 260—669)

This invention relates to the pyrolytic decomposition of polymers of styrene compounds.

It has been proposed heretofore as a means of producing pure styrene to treat crude oils containing a substantial proportion of styrene so as to polymerize the styrene, separate from the polymerized oil a brittle styrene resin and heat the resin to pyrolysis temperatures to depolymerize the polymerized material and obtain a decomposition product from which pure styrene may be recovered. In the pyrolytic decomposition of the brittle styrene resins, batchwise heating of the polymer over a prolonged period of time at relatively low temperatures has generally been employed. The yield of monomeric styrene in these processes have been found to be comparatively low and this yield steadily decreases as the size of the charge and the time of pyrolysis increases. The pyrolysis by these prior art processes generally produced also as one of the decomposition products a heavy non-volative residue apparently consisting of hydrocarbon compounds very high in carbon and having very little utility.

It is an object of this invention to provide a new method for the pyrolytic decomposition of resins comprising polymers of styrene compounds whereby there may be obtained a high yield of monomeric styrene compound and a product is produced which may readily be worked up into substantially pure styrene compound.

I have discovered that a surprisingly high yield of monomeric styrene compound may be obtained from the polymer of a styrene compound, e. g. a polystyrene resin, by subjecting the polymer to rapid pyrolysis at a temperature of at least 350° C., preferably in a continuous process carried out in such a manner that substantially as soon as the polymer reaches pyrolysis temperature it breaks up into primary decomposition products which are subtantially immediately removed from the pyrolysis zone.

I have further found that the above preferred pyrolysis process to give primary decomposition products which are substantially immediately removed from the pyrolysis zone may advantageously be carried out by melting the resin and causing a stream or film of the molten resin to flow continuously down an inclined surface maintained at a temperature of at least about 400° C., preferably 400°–700° C., in a zone maintained under high vacuum, whereby the moving stream of molten resin is rapidly heated to pyrolysis temperature and substantially immediately undergoes decomposition with vigorous boiling to form products that are substantially completely volatilized under the low pressure existing in the pyrolysis zone; this vapor product is continuously removed from the pyrolysis zone substantially as soon as it is formed.

When pyrolysis is carried out in accordance with my invention, in addition to styrene a substantial proportion of a higher boiling oil is formed as a volatile product of decomposition. It may be advantageous, particularly when the resin has been subjected to the preferred instantaneous pyrolysis as above described to give primary decomposition products, to subject this less volatile oil produced along with the styrene to a further secondary pyrolysis. This may be accomplished by subjecting the oil either to the above described process or to other pyrolysis methods known to the art, for example, the usual vapor phase pyrolysis whereby the heavy oil is further decomposed to form additional monomer, other valuable benzenoid hydrocarbons such as toluene and ethyl benzene, and a small amount of tarry and carbonaceous residue. This invention thus also comprises a step-wise process for pyrolyzing polystyrene-type resins to obtain an unusually high yield of monomeric styrene compound.

The process of this invention is applicable in general to pyrolysis of polymers of a styrene compound, i. e. styrene itself or a substituted styrene such as methyl styrene. One of its important applications is the recovery of styrene from a polystyrene resin, and the process hereinafter described as illustrative of my invention accordingly refers to pyrolysis of such a resin. My process has been found particularly advantageous for recovering a substantially pure styrene from a crude oil containing styrene; the recovery of the styrene from the crude oil is brought about by subjecting the oil to heat or catalyst polymerization whereby a brittle polystyrene resin is formed, and thereafter subjecting this resin to pyrolysis in accordance with my invention. As examples of crude styrene oils there may be mentioned the styrene fraction of drip oil (the oil condensed from coal distillation gas or carburetted water gas), various light oils (the oils scrubbed from industrial gases such as coke-oven gas or water gas, or the light oil distillates from various tars such as coal tar and water-gas tar), coke-oven distillates in general, cracked and reformed petroleum, the crude products of styrene synthesis, and the styrene fraction from a previous polystyrene pyrolysis product. For example, a crude fraction of drip oil boiling within the range 125° to 155° C. and containing from 20% to 80% styrene may be heated to a temperature of 200° C. for 36 hours to form a crude brittle resin which is separated from the non-polymerized constituents by vacuum or steam distillation.

The pyrolysis may be carried out under atmospheric pressure, but in preferred operation is carried out under reduced pressure, preferably at a pressure of less than 350 mm. of mercury. When carried out at atmospheric pressure the products of primary decomposition may remain in the pyrolysis zone sufficiently long for some of the higher boiling materials in this product to undergo secondary pyrolysis. Although an increased yield in styrene may thus be obtained, the resulting product contains an increased amount of non-styrene hydrocarbons difficultly separable from styrene by fractional distillation. A substantially 100% styrene product is, therefore, not so readily separated from this pyrolysis product. Operation at atmospheric pressure may, however, be advantageous, in view of the increased styrene yield, when the separation of a substantially 100% styrene product is of less importance.

In operation at atmospheric pressure the time of pyrolysis, I have found, should be not more than about twenty minutes; i. e. the entire volatile decomposition product from the heating of a given amount or charge of the resin should be withdrawn within twenty minutes after the said given amount or charge of the resin has first been brought to pyrolysis temperature (about 350° C.). In operation under reduced pressure (not more than about 350 mm.), the pyrolysis time should not exceed five minutes. As above indicated, the most advantageous mode of operation for the process of this invention is the continuous pyrolysis process in which the molten resin flows upon a heated surface, e. g. down an inclined heated tube. In this method of operation, I have found, the resin undergoes decomposition to form a volatile product almost instantaneously, i. e. in less than one minute.

The advantageous pyrolysis temperature for the process of this invention, i. e. temperature of resin undergoing pyrolysis, is a temperature of at least 350° C., preferably within the range of about 350° to 450° C. The resin may be maintained within this temperature range by contacting it with a heated still wall, tube, or other contact material, the outer wall or "skin" temperature of which should generally be maintained above 400° C., preferably within the range of 400° to 700° C., to keep the pyrolysis zone at the resin pyrolysis temperature indicated above. The resin may be decomposed substantially instantaneously within the above mentioned pyrolysis temperature range to form products which are substantially completely volatile. The most advantageous temperature for the contact material within the above range of 400° to 700° C. will depend upon the particular means employed for contacting the polystyrene with the heated contact material, as well as the type of polystyrene resins employed. I have generally found it advantageous to maintain the contact material at a temperature within the range of 500° to 600° C.; in some instances, however, it may be found desirable to maintain the outer wall temperature of the contact material within the range of 550° to 700° C.

In my process, particularly in its preferred form in which the resin flows down an inclined tube or surface and boils vigorously as it comes into contact with the heated surface, the flow of the polystyrene over the contact material maintained at a temperature within the aforesaid range, together with the vigorous boiling action, subjects the polystyrene to violent agitation, causing the molten resin to sweep rapidly over the heated surface and continually bringing fresh portions of resin into contact with hot surface. The polystyrene is thus quickly, i. e. almost instantaneously, heated to pyrolysis temperature and decomposed. In feeding the resin onto a heating surface, I have found it desirable to maintain a low ratio of resin feed to heating surface area, thus forming a relatively thin layer of resin on the heating surface; in a number of runs with an iron pipe pyrolysis unit at about 600° C., for example, a feed ratio as low as about two pounds resin per hour per square foot of effective heating surface was employed.

When operating in accordance with my preferred process involving continuously flowing the resin in molten condition through a pyrolysis zone maintained under vacuum, the primary decomposition products which are formed are substantially completely volatile. 95% to 100% of a polystyrene resin may be recovered as vapor in such a pyrolysis operation. For example, in a series of runs in which 40 to 60 pounds of styrene resin were pyrolyzed, a total of only a few grams of non-volatile residue was formed. Moreover, there is substantially no evolution of non-condensables such as methane in this preferred process of my invention, and substantially no by-products with boiling points close to styrene are formed. The product from continuous pyrolysis under vacuum, therefore, is particularly advantageous for the separation of a substantially pure styrene product in high yield by fractional distillation. The principal constituents of the decomposition product formed by continuous pyrolysis under vacuum are the monomer, dimer and trimer of styrene.

The volatile product of pyrolysis is removed from the pyrolysis zone, condensed and fractionated, preferably under vacuum, to separate the monomer of the styrene compound which usually makes up about 40% to 65% of the primary decomposition product. It has been found advantageous to separate the above condensate into two fractions, a first fraction high in monomer and a residual fraction containing low polymers of styrene and other high boiling material which, as above indicated, may be further pyrolyzed.

The styrene-rich fraction may be subjected to chemical purification treatments and worked up by fractional distillation into a substantially 100% styrene product. Either this product or the styrene-rich fraction from which it is produced may be readily converted into a tough styrene resin by heating the styrene or a solution thereof at a temperature of 100° to 135° C. for 120 to 124 hours.

As indicated, the residual heavy oil fraction may, if desired, be subjected to a second pyrolysis either by the same method described above or other methods known in the art. For example, the oil may be continuously fed to a still maintained at about 500° C. topped by a short column equipped with the usual back-flow and receiver arrangements. The temperature at the top of the column may be regulated to remove only monomer and other low-boiling benzenoid hydrocarbons. A further yield of 25% to 30% styrene based on the heavy oil may thus be obtained. 40% to 50% is recovered as benzenoid hydrocarbons, e. g. toluene and ethyl benzene, and the remainder is left as a tarry residue.

All the factors contributing to the improved results obtained in my process over prior art processes are not clear. It appears probable, however, that the short time the resin is heated at pyrolysis temperature, i. e. above 350° C., before undergoing pyrolytic cracking to form removable products is an important factor in obtaining the unusually high yield of readily separated styrene which is obtained in my process. In the prior art processes a batch of resin is generally heated for a period of many hours to bring about complete pyrolytic decomposition and this appears to cause degradation of the resin such that when it finally undergoes pyrolytic cracking it forms a lower proportion of styrene and other volatile products and a comparatively high proportion of nonvolatile residue.

There is shown in diagrammatic form on the accompanying drawing for purposes of illustration an apparatus suitable for carrying out the preferred pyrolysis process of my invention.

Reference numeral 1 indicates a feed tank in which a supply of resin is maintained molten by means of the heating jacket 2. A stream of the resin is allowed to flow through the valve 3 into the inclined tube 4, preferably at a rate such that a thin layer of resin is formed. The tube is maintained at pyrolysis temperature by a molten salt bath 5 constituted of potassium nitrate and sodium nitrite in which the tube 4 is immersed. Other means for maintaining the temperature, for example, an electric combustion furnace or heater, may be employed. The molten resin undergoing pyrolysis flows from the tube 4, through the vertical header tube 6, down into the second inclined tube 7, also immersed in the molten salt bath. The volatile products of pyrolysis are withdrawn upwardly through the header tube 6, pass through the precooler 12, and thence into the fractionating column 9. An overhead product, consisting of styrene together with a small amount of other low-boiling materials, passes from the column into the condenser 15, and after condensation is withdrawn as indicated at 11. This product may be subjected to chemical purification treatments and refractionated. The higher boiling material is withdrawn from the still under the column as indicated at 10. Non-volatile residue, if any, may be discharged through the valve 8. Wells 13 and 14 are provided for the insertion of thermocouples to indicate the temperatures of the salt bath and within the tubes 4 and 7.

Other apparatus than that illustrated may be employed for carrying out the preferred continuous pyrolysis process of my invention. For example, a single inclined pipe, instead of two, may be employed for the pyrolysis, or more than two pipes arranged for series or parallel flow may be employed, with a number of vapor headers at intervals along the pipes, if desired. The volatile product of decomposition may be condensed and later fractionated; preferably, however, the product is subjected to fractionation without intermediate condensation, and the fractionating unit as well as the pyrolysis unit are maintained under vacuum.

The following examples, in which all parts are by weight, are illustrative of my invention:

*Example 1.*—1,964 parts of a brittle polystyrene resin, obtained by heating a styrene crude containing about 69% styrene for 63 hours at 135° C. and separating the unpolymerized constituents by steam distillation, was maintained molten at a temperature of about 225° C. and a stream of the molten resin was allowed to flow through an inclined tube maintained at a temperature of 400° to 450° C. in an electric combustion furnace; less than one minute elapsed between the introduction of the resin into the tube and the recovery of the decomposition products therefrom. An absolute pressure of 4 mm. mercury was maintained in the pyrolysis tube. 99.6% of the resin charged was volatilized upon pyrolytic decomposition. The volatile decomposition products were condensed and fractionated to give 62.3% monomeric styrene and 37.3% of material distilling above 157° C. at atmospheric pressure based on the weight of the resin charged.

*Example 2.*—A molten resin as in Example 1 was charged to an inclined tube still of the type illustrated in the drawing; the pyrolysis tubes were maintained at a pressure of 6 to 8 mm. and the wall temperature thereof was 600° to 650° C.; a molten salt bath constituted of potassium nitrate and sodium nitrite maintained at a temperature of 600° to 650° C. kept the tubes within this temperature range. Less than one minute elapsed between the introduction of the resin into the tube and the recovery of the decomposition products therefrom. When the resin reached pyrolysis temperature it was completely decomposed to form a volatile product. The volatile product was fractionally distilled to separate pure styrene; the yield was 64.8% monomeric styrene, 6.2% material other than styrene distilling below 157° C. (e. g. toluene and ethyl benzene) and 29% of material distilling above 157° C. based on the resin charged.

*Example 3.*—A crude drip oil fraction of boiling range 130° to 155° C. and 31.4% styrene content was heat polymerized at 190° C. for 24 hours under a pressure of 35 pounds per square inch (gauge). A dark brittle resin (melting point 143° C.), corresponding to 64.3% of the available styrene was recovered after steam distillation of the polymerized oil. The resin was pyrolyzed at reduced pressure (11 mm. mercury measured in the receivers) by passing it at the rate of 10 grams per minute through a pyrolysis zone comprising a tube nine feet long (internal diameter, one inch) immersed in a molten salt bath maintained at 550° C.; less than one minute elapsed between the introduction of the resin into the tube and the recovery of the decomposition products therefrom. Pyrolysis distillate (95.3% of crude resin charge) was fractionally distilled to yield monomeric styrene of 98.5% purity corresponding to 47.2% by weight of the resin originally charged.

*Example 4.*—The drip oil fraction of the preceding example was heat polymerized at 140° C. for 24 hours under atmospheric pressure. There was produced a brittle styrene resin of 160° C. melting point, which was pyrolyzed at reduced pressure. The resin was fed at the rate of about 250 pounds per hour into a 50-foot tube (1.5 inches internal diameter), immersed in a molten salt bath maintained at 560° to 580° C.; less than one minute elapsed between the introduction of the resin into the tube and the recovery of the decomposition products therefrom. Vapors leaving the pyrolysis zone were at a temperature of 530° to 560° C. Pressure in the pyrolysis zone was 250 mm. Hg, while pressure on the receivers for the condensed pyrolysis distillate was 18 mm. Hg. The pyrolysis product was fractionally distilled to yield monomeric styrene of 95% purity corresponding to 55% of the crude resin charged.

To obtain an additional yield of styrene, all or part of the material distilling above 157° C. in the above examples may be further pyrolyzed in either batch or continuous operation. For example, a distillate cut of boiling range 290° to 325° C. from miscellaneous primary pyrolyses was subjected to pyrolysis at 421°–525° C. The material decomposed to 28.5% styrene, 49% of other benzenoid hydrocarbons distilling below 200° C., and 22.5% of non-volatile residue.

The pyrolysis method of this invention may be advantageously employed in recovering the styrene from any polystyrene material, i. e. either a crude resin or a high quality pure resin; for example it may be used to recover styrene from scrap material produced in the manufacture of articles made from styrene resins.

It is intended that all matter contained in the above description shall be interpreted as illustrative, and the scope of my invention is not to be restricted thereby.

I claim:

1. A process which comprises subjecting polystyrene resin to a pyrolysis temperature above 350° C., under a pressure not higher than 350 mm. mercury, and imparting heat thereto at a rate such that substantially complete thermal decomposition of the polystyrene is effected in a period of time not exceeding twenty minutes, and removing the decomposition products from the zone of elevated temperature substantially immediately after the formation thereof.

2. A process which comprises substantially completely decomposing a polystyrene resin by heating the polymer at a temperature of 350° to 450° C. under a pressure not higher than about 350 mm. Hg for not more than about five minutes.

3. In a process for pyrolytic decomposition of a polymer of a styrene compound, the improvement which comprises contacting a moving body of the polymer with a material at a temperature in the range about 400°–700° C., and maintaining a pressure less than about 350 mm. Hg in the pyrolysis zone.

4. A continuous process for pyrolytic decomposition of a polystyrene resin, which comprises subjecting a flowing stream of the molten resin to contact with a material of high heat conductivity maintained at a temperature of about 500°–600° C. in a zone maintained under a pressure of less than about 350 mm. Hg.

5. In a process for pyrolytic decomposition of a resin comprising a polymer of a styrene compound, the step which comprises decomposing the resin by heating it within the temperature range about 350°–450° C., under a pressure not higher than 350 mm. mercury, for an average time of less than about one minute.

6. In a process for production of a styrene compound by pyrolysis of a resin containing a polymer of the styrene compound, the steps which comprise subjecting the resin to pyrolysis temperature of at least 350° C., under a pressure not higher than 350 mm. mercury, for a period of not more than about 20 minutes, removing the primary decomposition products substantially as soon as formed, separating monomeric styrene compound from said primary decomposition products and subjecting the remainder of said products to further pyrolysis to form additional monomer.

7. A process which comprises pyrolyzing polystyrene by passing it through a pyrolysis zone where it is contacted with a heat exchange surface maintained at about 400–700° C., the pyrolysis zone being maintained at a pressure under about 350 mm., whereby substantially as soon as the polymer reaches pyrolysis temperature it is substantially completely decomposed to form products substantially completely volatile under the conditions of pyrolysis, withdrawing and condensing the volatile products of decomposition and separating monomeric styrene therefrom.

8. In a process for producing monomeric styrene compound from a polymer of the styrene compound, the step which comprises subjecting the polymer to a pyrolysis temperature above 350° C. under a pressure not higher than 350 mm. of mercury and imparting heat to the polymer at a rate such that substantially complete thermal decomposition of the polymer is effected in a period of time not exceeding 20 minutes.

9. In a process for pyrolytic decomposition of a polymer of a styrene compound, the step which comprises contacting a flowing stream of liquid polymer under a pressure not higher than 350 mm. mercury with a heated body maintained at a temperature of at least 400° C. to effect substantially complete thermal decomposition of the polymer within a period of time less than that required to cause degradation of the polymer substantially affecting the yield of monomer obtained upon pyrolysis.

10. A process for pyrolytic decomposition of a polymer of a styrene compound which comprises contacting a flowing stream of liquid polymer under a pressure not higher than 350 mm. mercury, with a heat transfer surface maintained at a temperature of at least 400° C., maintaining said stream of liquid polymer in substantially continuous forward flow along said surface, and imparting heat to the polymer to effect substantially complete thermal decomposition within a period of not more than about 5 minutes after the polymer has attained a temperature above 350° C.

WILBERT A. KING.